United States Patent Office 3,278,536
Patented Oct. 11, 1966

3,278,536
PYRIMETHAMINE SALT WITH 2,6-DIHYDROXY-ISONICOTINIC ACID
Edward F. Elslager and Donald F. Worth, both of Ann Arbor, Mich., assignors to Parke, Davis & Company, Detroit, Mich., a corporation of Michigan
No Drawing. Original application Jan. 23, 1961, Ser. No. 83,910, now Patent No. 3,236,849, dated Feb. 22, 1966. Divided and this application Sept. 10, 1965, Ser. No. 486,534
1 Claim. (Cl. 260—256.4)

This is a division of our copending application Serial No. 83,910, filed January 23, 1961, now U.S. Patent No. 3,236,849.

The present invention relates to a salt of 2,4-diamino-5-(p-chlorophenyl)-6-ethylpyrimidine of the formula

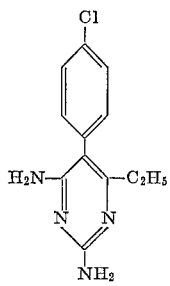

with 2,6-dihydroxyisonicotinic acid or citrazinic acid of the formula

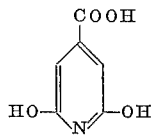

and to methods for its production.

The compound of the invention is produced by reacting 2,4-diamino-5-(p-chlorophenyl)-6-ethylpyrimidine with 2,6-dihydroxyisonicotinic acid; or by reacting a soluble salt of 2,4-diamino-5-(p-chlorophenyl)-6-ethylpyrimidine with a soluble salt of 2,6-dihydroxyisonicotinic acid. The term "soluble salt" is used herein in a relative sense and means a degree of solubility substantially greater than that exhibited by the product of the invention. Representative soluble salts suitable for use in the process of the invention include 2,4-diamino-5-(p-chlorophenyl)-6-ethylpyrimidine hydrochloride, hydrobromide, hydriodide, sulfate, phosphate, sulfamate, acetate, lactate, tartrate, gluconate, citrate and salicylate; as well as alkali metal, alkaline earth metal, ammonium and amine salts of 2,6-dihydroxyisonicotinic acid. If desired, the starting materials used in the process can be converted in situ to the desired base, acid or soluble salt form by treatment with an acid or base, as by neutralizing a carboxyl group with base, by treatment of a carboxylate salt with a mineral acid, or by treatment of the pyrimidine base with an acid. The process of the invention is preferably carried out in a solvent in which the reactants are at least partially soluble and which is relatively unreactive toward each of the reactants. Suitable solvents include water, aqueous alkanols, dimethylacetamide, dimethylformamide and acetonitrile and mixtures thereof. Other satisfactory reaction media can be chosen from among a wide variety of solvents, particularly those which are neutral and polar. The salt formation proceeds fairly rapidly upon mixing the reactants in the selected solvent. The process can be carried out at room temperature or below, although in many cases a high yield and a crystalline form conductive to rapid filtration are facilitated by heating the reaction mixture for up to about an hour and then chilling it. The reactants are customarily employed in approximately equimolar quantities. In those cases where the reaction product precipitates directly it is isolated by filtration or centrifugation. In those instances where it does not precipitate directly it is first made insoluble by concentration of the reaction mixture or by dilution of the reaction mixture with a solvent in which the product is insoluble, and then collected.

The product of the invention is an antimalarial agent exhibiting especially long duration of action. It is known that 2,4-diamino-5-(p-chlorophenyl)-6-ethylpyrimidine, otherwise known as pyrimethamine, is an antimalarial drug and is highly active against erythrocytic parasites. However, for collective prophylaxis the usual recommended adult dose is 25 mg. administered once a week. For large scale malaria eradication programs it is impractical to administer an antimalarial agent on such a frequent schedule. However, the compound of the present invention possesses the high antimalarial activity of 2,4-diamino-5-(p-chlorophenyl)-6-ethylpyrimidine, is non-irritating upon injection, and exhibits unusually long duration of action, thereby making it possible to extend the dosage interval from one week to as long as several months. The product of the invention can be formulated into suspensions which are pharmaceutically acceptable for intramuscular injection, using suspending vehicles such as 40% benzyl benzoate and 60% castor oil, or water containing emulsifying or dispersing agents.

The invention is illustrated but not limited by the following example.

*Example*

A solution of 1.55 g. of 2,6-dihydroxyisonicotinic acid in 50 ml. of hot dimethylacetamide is added to a stirred solution of 2.49 g. of 2,4-diamino-5-(p-chlorophenyl)-6-ethylpyrimidine in 200 ml. of hot methanol. The mixture is cooled and the light-colored product, salt of 2,4-diamino-5-(p-chlorophenyl)-6-ethylpyrimidine with one formula weight 2,6-dihydroxyisonicotinic acid, is collected on a filter, and dried in vacuo at 80° C. for 18 hours; M.P. about 235° C. with decomposition after crystallization from an ethanol-water mixture. The structural formula is

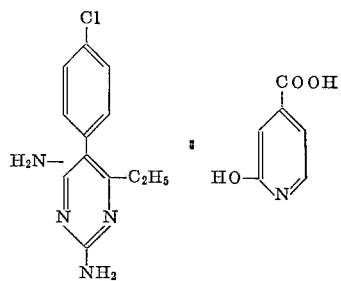

We claim:
2,4-diamino-5-(p-chlorophenyl)-6-ethylpyrimidine salt with one formula weight 2,6-dihydroxyisonicotine acid.

No references cited.

ALEX MAZEL, *Primary Examiner.*

MARY U. O'BRIEN, *Assistant Examiner.*